Patented Apr. 22, 1930

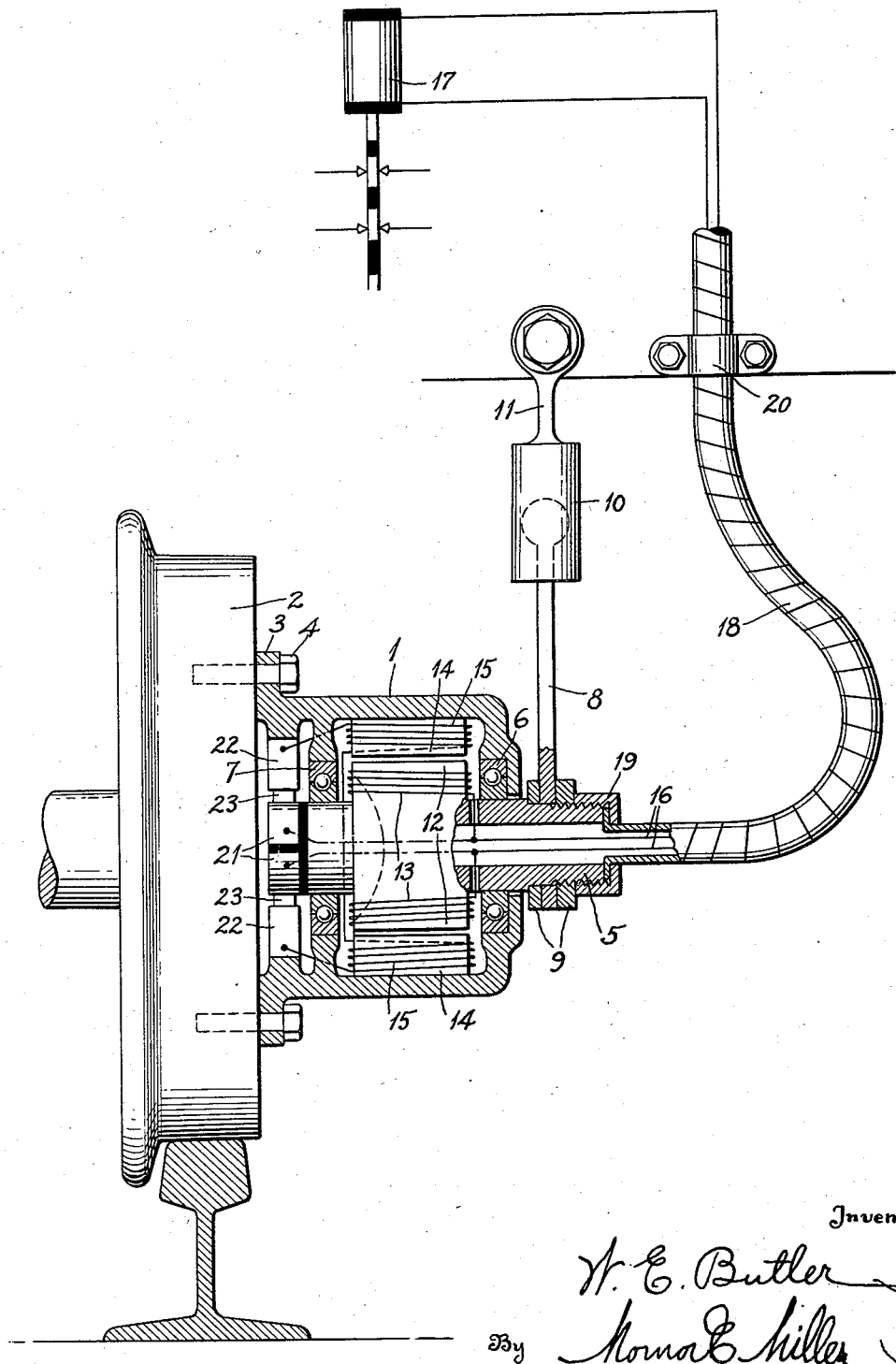

1,755,313

UNITED STATES PATENT OFFICE

WILLIAM E. BUTLER, OF EASTON, PENNSYLVANIA

ELECTRIC SPEED GOVERNOR

Application filed February 26, 1927. Serial No. 171,184.

The present invention relates to speed controlled and responsive devices, such as are employed for indicating the speed of rotation of a rotating member or the speed of travel of a vehicle, or for controlling the movement of a locomotive or other machine in accordance with variations in speed thereof, and it is the primary object of the invention to provide a novel and improved electrical device of that kind whereby electrical current of voltages varying in proportion to the speed are generated for purpose of speed indication or control.

Another object of the invention is the provision of an electric speed governor which may be applied directly to the wheel of a locomotive or railway car so as to be carried by and also actuated by said wheel.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein the device is shown attached to a wheel, with portions shown in section and portions shown in elevation, and the electrical circuits illustrated diagrammatically.

In carrying out the invention there is provided an electrical generator or dynamo comprising the rotor 1 which provides a casing to enclose the other parts, and said rotor is of iron or other magnetic material. The inner end of the rotor is open and is applied to the outer side of the locomotive or car wheel 2, as shown, although the device may be used for other purposes for which it is suitable. As shown, the inner end of the rotor 1 has a flange 3 secured by bolts 4 or otherwise to the face of the wheel with the device concentric with the wheel and its axle.

A stator 5, comprising a tubular armature of iron or other magnetic material, is mounted in the rotor 1 by means of suitable anti-friction bearings 6 and 7, and the outer terminal of the stator 5 projects through an opening in the outer end of the rotor.

The stator 5 is prevented from rotating with the wheel 2 by being suitably connected with a non-rotating member such as the frame or body of the locomotive, car or other vehicle. As shown, an arm 8 is held between collars 9 secured on the outer protruding terminal of the stator 5 and has a sliding and oscillatory connection, as at 10, with a member 11 secured to the non-rotating member, thereby preventing the stator 5 from rotating, but permitting of relative movements of the wheel truck and vehicle body or frame. The sliding and flexible joint 10 permits the vehicle body or frame to move upwardly and downwardly on its spring mounting, and also permits the truck to be angled when negotiating curves.

The stator or armature 5 has the pole portions or cores 12 on which the armature coils 13 are wound, and the rotor or casing 1 has inwardly extending pole portions or cores 14 on which the field coils 15 are wound, the pole portions 14 moving past the portions 12 in inductive relation thereto as in an ordinary electrical generator or dynamo. The coils 13 are connected in series with conductors 16, connected to the solenoid 17 or other device which is controlled by the governor. The conductors 16 are preferably protected within a flexible conduit or hose 18 having one end connected, as at 19, with the outer end of the stator 5, and said conduit is held by a clamp 20 carried by the vehicle body or frame.

As shown, a direct current generator is employed, and the inner end of the stator 5 carries a commutator having the segments 21 to which the conductors 16 are electrically connected, and the rotor 1 has brush holders 22 in which brushes 23 are mounted to engage the commutator. The coils 15 are connected in series with the brush holders 22 and brushes 23, whereby electrical current generated in the coils 13 is unidirectional, whereas the current in the coils 15 is reversed in synchronism with the rotation of the rotor. By using collector rings in lieu of the commutator, as well known in the art, the device may operate as an alternating current generator, so that the device may be constructed either as a direct current generator or as an alternating current generator. Furthermore, the rotor 1 may constitute a permanent magnet, without using the coils 15, so as to operate like a magneto.

The rotor 1 being secured to the wheel 2 will be bodily carried thereby and will also be rotated with the wheel so as to directly drive the generator, and the wheel 2 being of iron will assist in completing the magnetic circuit of the rotor and stator.

It will be apparent that the voltage of the current generated will vary in proportion to the speed of rotation of the wheel 2, and this may be taken advantage of for controlling the locomotive or other mechanism. Thus, the solenoid or electromagnet 17 may control electrical circuits for making and breaking the circuits according to variations in speed, such as for the purpose of controlling the speed of the train, or the device 17 may be an electric tachometer or speed indicator for indicating the speed of the train, or the like. As shown, the device 17 is a solenoid, the core of which operates a plurality of switches or bridges for different electrical circuits, in order that the movable member is moved to various positions in accordance with the amount of energization of the solenoid. The solenoid 17 is energized solely from the armature winding or coils 13 so as to be energized in proportion to the speed of rotation of the rotor. By attaching the device directly to the wheel 2 this provides for positive actuation of the device, without danger of slippage or breakage of the connection between the device and the driving member, and the use of a belt, gearing or other connection between the device and driving member is also eliminated.

Having thus described the invention, what is claimed as new is:—

An electrical governor comprising a rotor casing having a magnetic field, one end of the casing being open and the other end closed, the casing having means at its open end for securing it to the face of a locomotive or car wheel, or the like, an armature journaled within the casing and projecting through said closed end of the casing, means connected to the projecting portion of the armature to prevent rotation thereof, and electrical translating means connected electrically with said armature.

In testimony whereof I hereunto affix my signature.

WILLIAM E. BUTLER.